US007019463B2

(12) United States Patent
Kesterson

(10) Patent No.: US 7,019,463 B2
(45) Date of Patent: Mar. 28, 2006

(54) DAYTIME RUNNING LIGHT MODULE AND SYSTEM

(76) Inventor: Raymond Kesterson, P.O. Box 1474, Kennesaw, GA (US) 30156

( * ) Notice: Subject to any disclaimer, the term of this patent is extended or adjusted under 35 U.S.C. 154(b) by 317 days.

(21) Appl. No.: 10/690,044

(22) Filed: Oct. 21, 2003

(65) Prior Publication Data

US 2005/0083706 A1 Apr. 21, 2005

(51) Int. Cl.
*B60Q 1/02* (2006.01)

(52) U.S. Cl. .......................... 315/82; 315/77; 340/468; 340/469; 340/457.2; 307/10.8; 307/112

(58) Field of Classification Search .................. 315/77, 315/82, 83; 340/468, 469, 457.2, 457.3, 340/471, 475; 307/10.1, 10.8, 112, 113, 307/157

See application file for complete search history.

(56) References Cited

U.S. PATENT DOCUMENTS 3,277,442 A * 10/1966 Kearney ..................... 340/469
3,430,100 A 12/1966 Dill, Jr.
3,341,736 A 9/1967 Fortney
3,397,342 A 8/1968 Dill, Jr.
3,603,840 A 9/1971 DuRocher
3,832,597 A 8/1974 Mitchell
4,684,819 A 8/1987 Haag et al.
4,723,095 A 2/1988 Svazas et al.
4,928,036 A 5/1990 Abboud
4,949,012 A 8/1990 Irick et al.
4,983,883 A 1/1991 Roland
5,030,884 A 7/1991 Roussey et al.
5,081,565 A 1/1992 Nabha et al.
5,438,237 A 8/1995 Mullins et al.
5,614,788 A 3/1997 Mullins et al.
5,760,546 A * 6/1998 Pabla et al. .................. 315/82
5,780,974 A 7/1998 Pabla et al.
5,796,094 A * 8/1998 Schofield et al. ........ 250/208.1
5,909,084 A 6/1999 Fu et al.
5,912,534 A 6/1999 Benedict
RE37,677 E 4/2002 Irie
6,452,337 B1 9/2002 Murata et al.
6,483,246 B1 11/2002 Sugimoto et al.
6,734,634 B1 5/2004 Kim

* cited by examiner

*Primary Examiner*—Haissa Philogene
(74) *Attorney, Agent, or Firm*—Smith, Gambrell & Russell LLP

(57) ABSTRACT

A daytime running light module for controlling the illumination of dual filament bulbs that act as vehicle parking lights and turn lights. The daytime running light module includes a pair of switches that are interconnected between the front vehicular lights and a power source to control the light emitted from the vehicular lights of the vehicle. The module operates to control when each filament of the two filament bulb or system is illuminated, such that the brighter filament of the bulb will be illuminated when the operator wishes to draw attention to the vehicle for safety purposes. The module may either automatically or manually control the light output as desired by the operator.

22 Claims, 11 Drawing Sheets

DAYTIME RUNNING LIGHT MODULE AND SYSTEM

FIELD OF THE INVENTION

The present invention relates to automotive headlamp arrangements, and, more particularly, to a module for generating high-intensity daytime running lights on a vehicle utilizing existing components on the vehicle.

BACKGROUND OF THE INVENTION

It is well known that automobiles that have daytime running lights provide a safer means of transportation than no lights at all. As a matter of fact, the governments of at least six nations have made it mandatory for all automobiles to have daytime running lights that are continuously lit whenever the car is in operation. Numerous studies have proven a statistical significance in the reduction of multi-vehicle daytime accidents through the use of daytime running lights. In addition, studies have shown that there is a significant reduction in daytime head-on and front corner collisions among cars with daytime running lights. Moreover, in a comparison between vehicles having daytime running lights and vehicles not having daytime running lights, it has been shown that the costs of repair for vehicles involved in similar collisions are less with vehicles having daytime running lights than vehicles not having daytime running lights. Such results indicate that daytime running lights aid drivers in avoiding collisions, or at least reducing the impact of collisions.

Various proposals have been made for incorporating daytime running lights into vehicles. One such proposal requires the addition of separate daytime running lights installed on a vehicle that are completely independent from the normal nighttime headlamps. Another proposal is simply to include a resistance in the circuit feeding the normal headlights, such that the resistance may be inserted during the daytime, and removed at night when brighter headlights are required. Both of these prior proposals are expensive and difficult to incorporate into vehicle designs. Specifically, the first proposal requires the provision of an entirely separate set of lights on the vehicle, which requires redesign of the vehicle in the front grille area. The second proposal requires the provision of a resistance, and also the energy wasted in heat through that same resistance.

It has also been proposed that the normal or standard headlamps of a car, which are normally connected to the battery in parallel for nighttime operation, be capable of connection in series during the daytime, so that each headlamp will "see" only half of the voltage provided. This will considerably reduce the brightness of each headlamp, and will not seriously decrease the life of the filament being utilized for the daytime lights. In addition, most all conventional daytime running light assemblies will shut the safety lighting in question off when the parking lights and/or head lights of the vehicle are turned on.

While these designs offer means for providing running lights during daylight hours, it is desirable to have a system which operates automatically, not requiring the operator to remember a new operational procedure, or to perform some task which he does not normally perform. Additionally, a system with universal installation applications and no vehicle age limits, ranging from existing semi-tractor trailers, buses, and fleet vehicles to personal and recreational-use private vehicles could be highly beneficial to automotive safety. Additional advantages might be realized in terms of fleet liability and insurance coverage with respect to medium and large corporations, should same corporate fleets be so equipped.

SUMMARY OF THE INVENTION

The present invention provides a daytime running light module for controlling the illumination of conventional American and imported vehicle parking lights/turn lights. The daytime running light module includes a pair of switches that are to be interconnected between the front vehicular lights and a power source to control the light emitted from the lights of the vehicle. That is, the module operates to control when one filament of a two filament bulb or system is illuminated, such that the brighter filament or bulb will be illuminated when the operator wishes to draw attention to the vehicle for safety purposes. The module may either automatically or manually control the light output as desired by the operator.

BRIEF DESCRIPTION OF THE DRAWINGS

A daytime running light module and system embodying the features of the present invention is depicted in the accompanying drawings which form a portion of this disclosure and wherein.

DESCRIPTION OF THE PREFERRED EMBODIMENT

Figure 1:
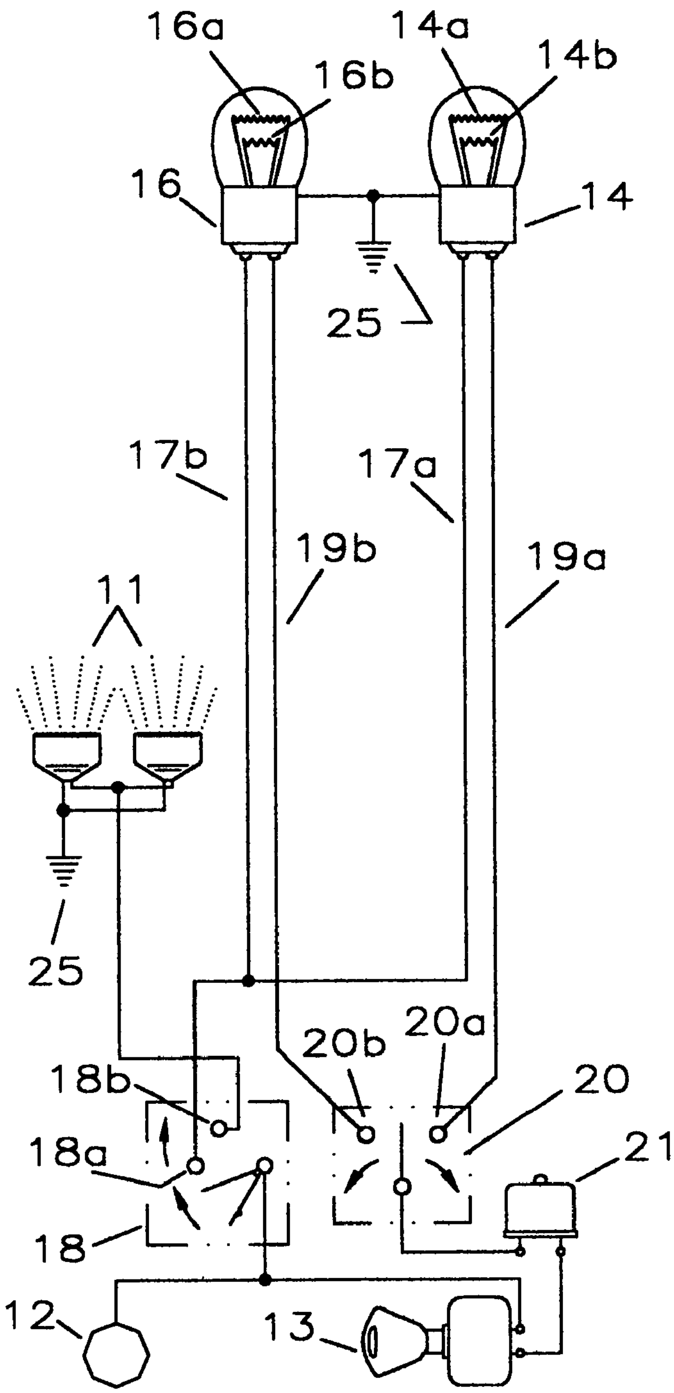
FIG. 1 is a schematic drawing of a connection of parking lights/turn signal lights of a conventional domestic vehicle of the prior art.

Referring now to FIG. 1, a conventional connection between a power source 12 and a set of automotive lights 11, 14, and 16 in a vehicle is illustrated. The power source 12 is a conventional vehicular power source, such as a 12-volt battery. The set of lights includes a pair of headlights 11 and a pair of front vehicular lights 14, 16 having dual filament bulbs. Traditional American and many import vehicle designs include a pair of front vehicular lights 14, 16 that are considered the front parking/turning lights. These front vehicular lights 14, 16 are conventionally integrated into the vehicle generally at the front right corner and the front left corner of the vehicle. The position of the front vehicular lights 14, 16 allow the operator to provide visible signals in traffic to other vehicles in close proximity to same vehicle concerning the operator's intentions in operation of that vehicle. For example, the right front vehicle light 14 is visible on the right side of the vehicle, and the left front vehicle light 16 is visible on the left side of the vehicle.

The first vehicular light 14 corresponds to the right side of the vehicle, and includes filaments 14*a* and 14*b*. The second vehicular light 16 corresponds to the left side of the vehicle, and includes filaments 16*a* and 16*b*. Each filament 14*a*, 14*b*, 16*a*, and 16*b* of the respective bulbs 14, 16 has a unique brightness corresponding to either a low intensity light or a high intensity light. In particular, the respective first filaments 14*a*, 16*a* have a brighter illumination than the second filaments 14*b*, 16*b* since they are conventionally used as turn signal directional lights, and the respective second filaments 14*b*, 16*b* having a softer illumination than the first filaments 14*a*, 16*a* since they are conventionally used as parking lights. The energized turn signal filament in a conventional vehicle bulb is characteristically designed to be approximately three times as bright as an energized parking light filament of that same bulb. Consequently, the flashing turn signal light has a high contrast, greater than the energized parking light during night operation of a vehicle, especially since both light sources in this case are emitting light from the same location and the same lamp housing.

Continuing to view FIG. 1, the power source 12 is connected to the headlights 11 and second dim filaments 14*b*, 16*b* of the vehicular lights 14, 16 via a parking/headlight switch 18 of the vehicle. That is, the parking/headlight switch 18 of the vehicle will determine when the headlights 11 and the dim filaments 14*b*, 16*b* are connected to the power source 12. On the other hand, the power source 12 is connected to the first bright filaments 14*a*, 16*a* of the vehicular lights 14, 16 via a turn signal switch 20, an ignition key switch 13, and a variable load thermal flasher 21. The negative connectors of lights 14, 16 are grounded at vehicle chassis ground 25.

The ignition key switch 13 is the same that typically starts the engine of the vehicle. With respect to the first bright filaments 14*a*, 16*a* of the vehicular lights 14, 16, the power source 12 will only connect to voltage if the ignition key switch 13 of the vehicle is energized, or in an "on" position (i.e., when the ignition key of the vehicle is in the "run" position).

The first filament 14*a*, 16*a* of each vehicular light 14, 16 is connected to the turn signal switch 20 via a respective turn signal connector 19*a*, 19*b*, while the second filament 14*b*, 16*b* of each vehicular light 14, 16 is connected to the conventional parking/headlight switch 18 via a respective parking light connector 17*a*, 17*b*. The turn signal switch 20 is a single pole, double throw switch that has a center off or "rest" position. The turn signal switch 20 may complete the circuit at turn signal connector 20*a* for a right directional signal, or may complete the circuit at turn signal connector 20*b* for a left directional signal, as desired by the vehicle operator. The parking/headlight switch 18 is a double pole, triple throw switch with an "off" position. In operation, when the parking/headlight switch 18 is closed to either a parking light only position 18*a* or a headlight-plus-parking light position 18*b*, the parking/headlight switch 18 will connect the second filaments 14*b* and 16*b* with the power source 12 such that the second filament 14*b*, 16*b* will be energized. Also, when the turn signal switch 20 is activated for a right direction turn through connector 20*a*, the first filament 14*a* of the right vehicular light 14 is connected with the power source 12 (through the thermal flasher 21 and ignition key switch 13, discussed below) such that the first filament 14*a* will be alternately energized and de-energized, in a pulsing on/off fashion. Similarly, when the turn-signal switch 20 is activated for a left directional turn through connector 20*b*, the first filament 16*a* of the vehicular light 16 is connected with the power source 12 through thermal flasher 21 and ignition key switch 13 such that the first filament 16*a* will be alternately energized on and off in like manner. The thermal flasher 21 generates the alternating on/off flashing voltage sent to the first filament 14*a* when the turn signal switch 20 is actuated to indicate a right turn directional signal, and the thermal flasher 21 generates an identical but redirected alternating on/off flashing voltage to the first filament 16*a* when the turn signal switch 20 is actuated to indicate a left turn directional signal.

The thermal flasher 21 is considered a variable load device, and accomplishes the on/off flashing 12-volt output due to its load transferring and carrying capabilities. The primary conventional flasher design has only two contacts, one contact is connected to the power source 12 through the ignition key switch 13, while the other contact will not initiate "flashing" without current being drawn from the output connector of the thermal flasher 21 (traveling on to the input of the turn signal switch 20, and connecting to either right turn connector 20*a* or left turn connector 20*b*). Without any resistive load for the thermal flasher 21 to sense, the thermal flasher 21 will not flash at all. As the current flow rate of the flasher 21 changes, the rate of flash of a conventional flasher usually also changes, hence why it is also known as a variable load flasher.

Figure 2:
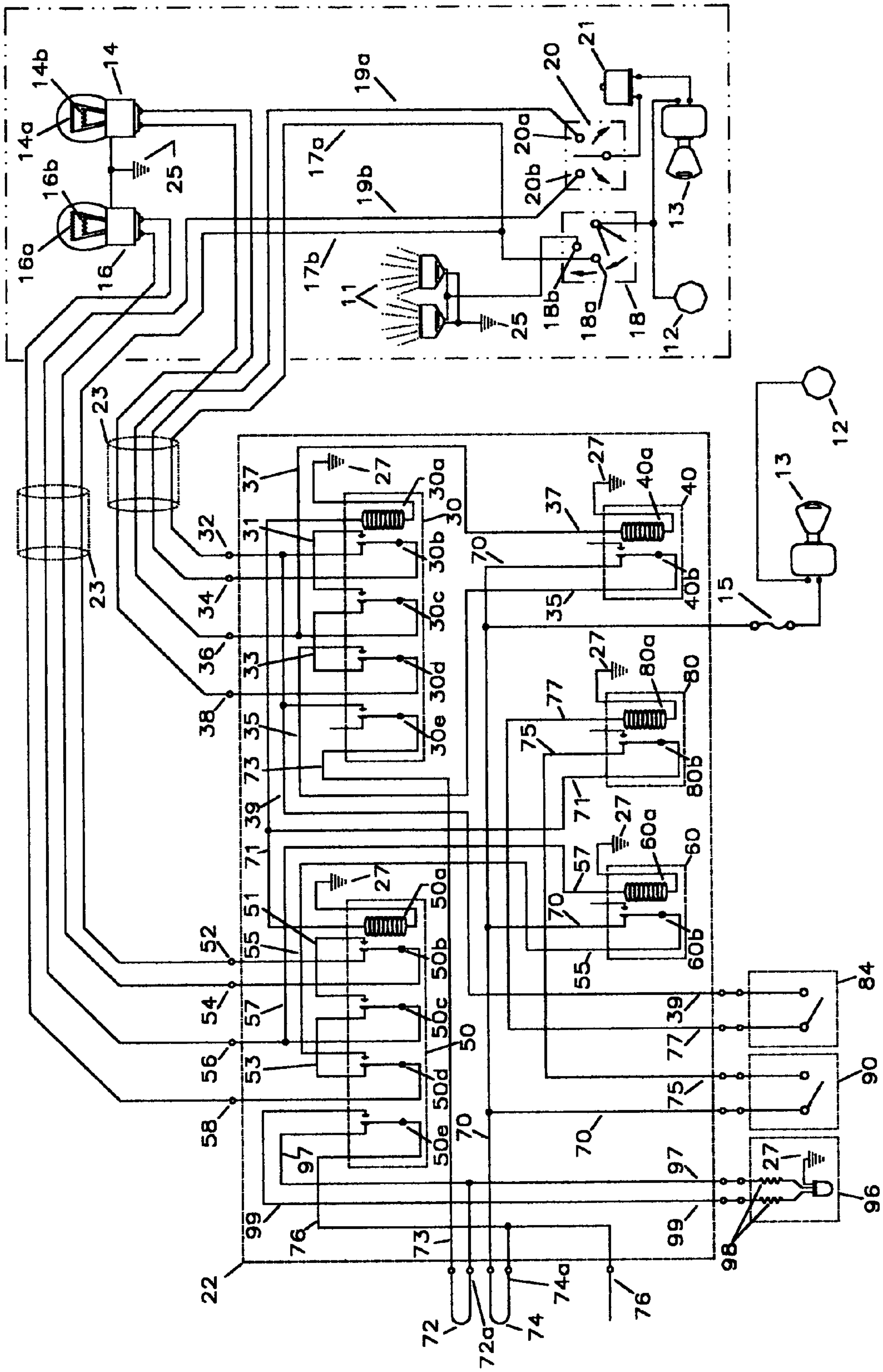
FIG. 2 is a schematic drawing of one embodiment of the daytime running light module of the present invention.

Looking now to FIG. 2, a schematic diagram of one embodiment of the present invention of the daytime running module 22 is illustrated. The daytime running module 22 is electrically connected to the parking light connector 17*a*, 17*b* and the turn signal connector 19*a*, 19*b*, between the power source 12 and the vehicular lights 14, 16. As a result, the daytime running light module 22 controls the intensity of the light produced by the vehicular lights 14, 16. In particular, the daytime running light module 22 includes a pair of light intensity switches 30, 50 that are interconnected between the front vehicular directional lights 14, 16 and the power source 12, controlling the light emitted from the vehicular lights 14, 16, but only when the ignition key switch 13 is in the ignition "on" or "run" position, as would be needed while driving in the daytime.

Each light intensity switch 30, 50 preferably comprises a relay, and, more specifically, a four pole, double throw relay. The first light intensity switch 30 is connected between the first vehicular light 14 and both the parking/headlight switch 18, and the right hand connector 20*a* of turn signal switch 20. Likewise, the second light intensity switch 50 is connected between the second vehicular light 16 and both the parking/headlight switch 18 and the left hand connector 20*b* of turn-signal switch 20. Also, each light intensity switch 30, 50 has an electromagnetic coil 30*a*, 50*a*, with one end of each coil connected to ground 27. Energizing the other end of coil 30*a*, 50*a* causes the respective light intensity switch 30, 50 to energize and switch four sets of contacts, with their terminals conventionally described as "common", "normally closed", and "normally open". The switch sets 30*b*, 30*c*, 30*d*, 30*e* and 50*b*, 50*c*, 50*d*, 50*e* typically connect the "common" terminal to a matching "normally closed" terminal when the corresponding switch is not energized. They also connect the "common" terminal to a matching "normally open" terminal when the corresponding switch is energized. The corresponding switch contacts "close" when a voltage trigger is applied and maintained at the coil 30*a* or the coil 50*a* of the corresponding light intensity switch 30 or 50.

In the embodiment shown in FIG. 2, the first light intensity switch 30 is a four pole, double throw switch such that is able to make and/or break potentially four connections between the first vehicular light 14 and both the parking/headlight switch 18 and the right turn connector 20*a* of the directional turn signal switch 20. All connections from the front lights 14, 16 and the light intensity switch 30, 50 are made using a four-strand, 18 gauge shielded cable 23. The first light intensity switch 30 is connected to the parking/headlight switch 18 via a parking light input connector 32 and parking light connector 17*a*, and it is connected to the second dimmer filament 14*b* via a parking light output connector 34. The first light intensity switch 30 is connected to the right turn connector 20*a* of the turn signal switch 20 through turn signal input connector 36 and turn signal connector 19*a*, and it is connected to the first brighter filament 14*a* through turn signal output connector 38. When the first light intensity switch 30 is not energized (i.e., turned "off"), the light intensity switch 30 connects the turn signal input connector 36 with the turn signal output connector 38 via circuit path connector 33 and the "normally closed" switched contact sets 30*c* and 30*d* of light intensity switch 30. Also, when the first light intensity switch 30 is "off", the light intensity switch 30 connects the parking light input connector 32 with the parking light output connector 34 using the "normally closed" switched contact set 30*b* of light intensity switch 30. As a result, the first light intensity switch 30 in the non-energized state connects the first brighter light filament 14*a* to its original turn signal connector 19*a*, and connects first dimmer light filament 14*b* to its original parking light connector 17*a*. Hence, right vehicle light 14 is reconnected to its former vehicle connections while the intensity light switch 30 is "off".

When the first light intensity switch 30 is energized (i.e., turned "on"), the turn signal output connector 38 is connected to the power source 12; through ignition key switch 13 and fuse 15, then through main power circuit connector 70, through the "normally closed" switched contact set 40*b* of turn signal interrupt switch 40, then through circuit path connector 35 and finally through the "normally open" switched contact set 30*d* of light intensity switch 30. As a result, when light intensity switch 30 is energized, the first brighter filament 14*a* will be lit as long as the ignition key switch 13 is energized or activated, and the turn signal interrupt switch 40 remains non-energized (i.e. stays "off"). Also, when the first light intensity switch 30 is energized, the parking light output connector 34 is connected to turn signal input connector 36 using the circuit path connector 31 and the "normally open" switched contact sets 30*b* and 30*c* of light intensity switch 30. This results in the right turn signal connector 20*a* of the turn signal switch 20 being connected to the first dimmer filament 14*b* when the first light intensity switch 30 is energized. The first dimmer filament 14*b* waits in the ready state to draw current from thermal flasher 21 should the turn signal switch 20 be actuated to indicate a right directional turn by the operator, and similarly to accept the pulsed turn signal output that was formerly connected to first brighter filament 14*a* before the first light intensity switch 30 was energized. Operationally, this first dimmer filament 14*b* becomes the surrogate or "new" turn signal filament, with the vehicle's turn signal circuitry rerouted to that same filament as long as first light intensity switch 30 is energized.

Rerouting of the vehicle's right turn signal output to the dimmer parking light filament causes the resistive load represented by the second dimmer filament 14*b* to draw current from and help cause the alternating on/off output action of the thermal flasher 21 through the turn signal switch 20, when same switch is actuated for a right directional turn and completes the circuit through right turn signal connector 20*a*. It must be noted here that there is conventionally a right rear bulb with parking light, turn signal, and also brake light duties (not shown) wired in parallel with the front bulb. The thermal flasher 21 also sees the resistive load of the rear turn signal (brighter) filament in parallel with the second dimmer filament 14*b* when first intensity light switch 30 is energized, in order that thermal flasher 21 will "sense" the combined total current load of the substitute front and normal rear right turn signal filament system.

Likewise, the second light intensity switch 50 of the embodiment shown in FIG. 2 is a four pole, double throw switch such that is able to make and/or break potentially four connections between the second vehicular light 16 and both the parking/headlight switch 18 and the left turn connector 20*b* of the directional turn-signal switch 20. The second light intensity switch 50 is connected to the parking/headlight switch 18 via a parking light input connector 52 and parking light connector 17*b*, and it is connected to the second dimmer filament 16*b* via a parking light output connector 54. The first light intensity switch 50 is connected to the left turn connector 20*b* of the turn signal switch 20 through turn signal input connector 56 and turn signal connector 19*b*, and it is connected to the second brighter filament 16*a* through turn signal output connector 58. When the second light intensity switch 50 is not energized (i.e., turned "off"), the light intensity switch 50 connects the turn signal input connector 56 with the turn signal output connector 58 via circuit path connector 53, and the "normally closed" switched contact sets 50*c* and 50*d* of light intensity switch 50. Also, when the second light intensity switch 50*a* is "off", the light intensity switch 50 connects the parking light input connector 52 with the parking light output connector 54 using the "normally closed" internal switched contact set 50*b* of light intensity switch 50. The result is that, the second light intensity switch 50 in the non-energized state connects the second brighter light filament 16*a* to its original turn signal connector 19*b*, and connects second dimmer light filament 16*b* to its original parking light connector 17*b*. Hence, left vehicle light 16 is reconnected to its former vehicle connections while the intensity light switch 50 is not energized (i.e., turned "off").

When the second light intensity switch 50 is energized (i.e., turned "on"), the turn signal output connector 58 is connected to power source 12; through ignition key switch 13 and fuse 15, then through main power circuit connector 70, through the "normally closed" switched contact set 60*b* of turn signal interrupt switch 60, then through circuit path connector 55 and finally through the "normally open" switched contact set 50*d* of light intensity switch 50. As a result, when light intensity switch 50 is energized, the second brighter filament 16*a* will be lit as long as the ignition key switch 13 is energized, and the turn signal interrupt switch 60 remains non-energized (i.e. stays "off"). Also, when the second light intensity switch 50*a* is energized, the parking light output connector 54 is connected to turn signal input connector 56 using the circuit connector 51 and the "normally open" switched contact sets 50*b* and 50*c* of light intensity switch 50. This results in the left turn signal connector 20*b* of the turn signal switch 20 being connected to the second dimmer filament 16*b* when the second light intensity switch 50 is energized. The second dimmer filament 16*b* waits in the ready state to draw current from thermal flasher 21 should the turn signal switch 20 be actuated to indicate a right directional turn, and similarly to accept the pulsed turn signal output that was formerly connected to second brighter filament 16*a* before the second light intensity switch 50 was energized. Operationally, this second dimmer filament 16*b* becomes the surrogate or "new" turn signal filament, with the vehicle's turn signal circuitry rerouted to the second dimmer filament 16*b* as long as second light intensity switch 50 is energized.

Rerouting of the left turn signal output of the vehicle to the second dimmer parking light filament 16*b* causes the resistive load represented by the second dimmer filament 16*b* to be detected by the thermal flasher 21 through the turn signal switch 20, when same switch is actuated for a left directional turn and completes the circuit through left turn signal connector 20*b*. It must be noted here that there is conventionally a left rear bulb with parking light, turn signal, and also brake light duties (not shown) wired in parallel with the front bulb. The thermal flasher 21 also sees the resistive load of the rear turn signal (brighter) filament in parallel with the second dimmer filament 16*b* when second intensity light switch 50 is energized, in order that thermal flasher 21 will "sense" the combined total current load of the substitute front and normal rear left turn signal filament system. Note that when intensity light switches 30, 50 are energized, the module 22 is considered to be "on", and how this happens will be further discussed herein.

The daytime running light module 22 additionally includes a first turn signal interrupt switch 40 and a second turn signal interrupt switch 60 that operate with the turn signal switch 20 to oscillate the brightness of the respective vehicular lights 14 and 16. Each turn signal interrupt switch 40, 60 is preferably a single pole, double throw switch (such as a relay). Looking to the first turn signal interrupt switch 40, the electromagnetic coil 40*a* of turn signal interrupt switch 40 is connected to the turn signal input connector 36 through circuit connector 37. The other end of coil 40*a* is connected to ground 27. When the turn signal switch 20 is actuated to indicate a right directional signal by completing the circuit at connector 20*a*, the turn signal input connector 36 connects pulsed right turn signal input (or "signal") to the coil 40*a* of first turn signal interrupt switch 40.

The turn signal pulsed output from turn signal switch 20 causes the first turn signal interrupt switch 40 to initially energize; thus momentarily disconnecting the "normally closed" connection of contact set 40*b* between the power source 12 and the turn signal output connector 38 (provided first intensity switch 30 is energized), whereas the turn signal output connector 38 is in turn connected to first brighter filament 14*a*. The thermal flasher 21 then internally alternates between opening and closing a connection between the ignition key switch 13 and the turn signal switch contact 20*a* of turn signal switch 20. Furthermore, the oscillating signal from the thermal flasher 21 travels through turn signal switch 20 to turn signal input connector 36, and through circuit connector 37 to alternately energize and relax the coil 40*a* of turn signal interrupt switch 40. This causes the connection between the power source 12 and first brighter filament 14*a* to be alternately reconnected and disconnected. During vehicle operation, the first brighter filament 14*a* is energized or "on" when the output from turn signal switch 20 is "off", and the first brighter filament 14*a* oscillates "off" when the output from turn signal switch 20 is energized or turns "on", then the cycle repeats. Thus, the first brighter filament 14*a* is on, then pulses off, then on, and then repeats while the turn signal switch 20 is energized or "on".

As previously discussed, first dimmer filament 14*b* is connected to be a substitute or replacement turn signal filament for the vehicle's existing turn signal system while first intensity switch 30 is energized. Since the first dimmer filament 14*b* is connected by the energized module 22 to the turn signal input connector 36, then the first dimmer filament 14*b* energizes from the pulsed signal from thermal flasher 21 at the same time the first brighter filament 14*a* is turning off. As stated earlier, the connection of turn signal input connector 36 to the first dimmer filament 14*b* is helpful to present a current drain or "load" to thermal flasher 21 in order for same thermal flasher 21 to operate. In summary, when a right turn signal is applied while the daytime running light module 22 is operational, the corresponding vehicular light 14 changes from a constant bright output to a flashing output repeatedly, alternating between the first dimmer filament 14*b* being energized and the first brighter filament 14*a* being energized. That is, the first vehicular light 14 will oscillate between a bright light and a dimmed light during the turn signal operation to provide directional notice to other vehicle operators. It is by this manner that the right turn signal directional lighting emitted by vehicular light 14 is restored to the vehicle during the operation of the daytime running light module 22.

Similarly, looking to the second turn signal interrupt switch 60, the electromagnetic coil 60*a* of second turn signal interrupt switch 60 is connected to the turn signal input connector 56 through circuit connector 57. The other end of coil 60*a* is connected to ground 27. When the turn signal switch 20 is actuated to indicate a left directional signal by completing the circuit at connector 20*b*, the turn signal input connector 56 connects pulsed left turn signal input (or "signal") to the coil 60*a* of second turn signal interrupt switch 60. The turn signal pulsed output from the turn signal switch 20 causes the second turn signal interrupt switch 60 to initially energize; thus momentarily disconnecting the "normally closed" connection of contact set 60*b* between ignition key switch 13 and the turn signal output connector 58 (provided intensity switch 50 is energized), whereas the turn signal output connector 58 is in turn connected to second brighter filament 16*a*. The thermal flasher 21 then internally alternates between opening and closing a connection between the i power source 12 and the turn signal switch contact 20*b* of turn signal switch 20. Furthermore, the oscillating signal from the thermal flasher 21 travels through turn signal switch 20 to turn signal input connector 56, and through circuit connector 57 to alternately energize and relax the coil 60*a* of turn signal interrupt switch 60. This causes the connection between the power source 12 and second brighter filament 16*a* to be alternately reconnected and disconnected. During vehicle operation, the second brighter filament 16*a* is energized or "on" when the output from turn signal switch 20 is "off", and the second brighter filament 16*a* oscillates "off" when the output from turn signal switch 20 is energized, or turns "on", then the cycle repeats. Thus, the second bright filament 16*a* is on, then pulses off, then on, and then repeats while the turn signal 20 is energized.

As previously discussed, the second dimmer filament 16*b* is connected to be a substitute or replacement turn signal filament for the vehicle's existing turn signal system while second intensity switch 50 is energized. Since the second dimmer filament 16*b* is connected by the energized module 22 to the turn signal input connector 36, the second dimmer filament 16*b* energizes from the pulsed signal from thermal flasher 21 at the same time the second brighter filament 16*a* is turning off. As described earlier, the connection of turn signal input connector 56 to the second dimmer filament 16*b* is helpful to present a current drain or "load" to thermal flasher 21 in order for same thermal flasher 21 to operate. In summary, when a left turn signal is applied while the daytime running light module 22 is operational, the corresponding vehicular light 16 changes from a constant bright output to a flashing output, repeatedly alternating between the second dimmer filament 16*b* being energized and the second brighter filament 16*a* being energized. That is, the second vehicular light 16 will oscillate between a bright light and a dimmed light during the turn signal operation to provide directional notice to other vehicle operators. It is by this manner that the left turn signal directional lighting emitted by vehicular light 16 is restored to the vehicle during the operation of the daytime running light module 22.

The daytime running light module 22 may additionally include an automatic override switch 80 that automatically deactivates first and second light intensity switches 30, 50 when the parking light/headlight switch 18 is in either the parking light only position 18*a* or the headlight-plus-parking light position 18*b*. The automatic override switch 80 is desirable to reduce the illumination of the vehicular lights 14, 16 back to their normal output during certain nighttime hours when brighter vehicle lights 14, 16 are not desired or needed.

The embodiment of the daytime running light module 22 such as shown in FIG. 2 includes the automatic override switch 80, preferably a single pole, double throw switch, such as a relay. The "normally closed" contact set 80*b* of automatic override switch 80 allows the power supply 12 to energize the respective coil inputs 30*a*, 50*a* of the first and second light intensity switches 30, 50, as long as automatic override switch 80 remains "off". Again looking at FIG. 2, the power supply 12 connects to the ignition key switch 13 and to main power circuit connector 70, then through main module power switch 90 (provided same switch is closed, further discussed herein), through circuit connector 75, through the "normally closed" contact set 80*b* of automatic override switch 80, and then to auxiliary power circuit connector 71, which in turn is connected simultaneously to both coil inputs 30*a*, 50*a* of the first and second light intensity switches 30, 50. This connection causes the module 22 to turn "on" when the ignition key switch 13 is energized, as light intensity switches 30, 50 being energized is the state where the module is considered to be "on". The electromagnetic coil 80*a* of automatic override switch 80 is connected to parking light/headlight switch 18 in the following manner: through parking light connector 17*a*, parking light input connector 32, then circuit connector 39, through a manual night override switch 84 (provided the same switch is closed), then through circuit connector 77, and then to coil 80*a* of automatic override switch 80. The other side of coil 80*a* is connected to ground 27. Activation of the parking light/headlight switch 18 will energize the coil 80*a* of the automatic override switch 80, provided the manual night override switch 84 is closed. When the parking lights are turned on, the automatic override switch 80 energizes and breaks the connection between ignition key switch 13 and the coils 30*a*, 50*a* of the first and second light intensity switches 30, 50. As a result, the first and second light intensity switches 30, 50 are not energized, and are effectively turned "off". Consequently, the daytime running light module 22 will be deactivated, and the vehicular lights 14, 16 will operate as originally connected by the vehicle manufacturer. Many conventional factory-installed daytime running light systems currently operate this way, turning "off" as the vehicle lights turn "on".

In the situation where the operator wishes to deactivate the automatic override switch 80, the manual night override switch 84 mentioned earlier is connected between parking light source voltage from parking light input connector 32 and coil 80*a* of automatic override switch 80. The inclusion of this automatic overrule switch 80 is desired when additional light and roadway visibility is desired, as in fog or hazy conditions; persons with decreased night vision may also desire the additional night lighting. The manual night override switch 84 is a standard single pole, double throw switch with an off or "rest" position. When the parking lights are "on" and the manual night override switch 84 is closed, the module 22 goes into night override, thereby turning the module "off" and reconnecting the vehicular lights 14, 16 to their factory wiring. However, when the manual night override switch 84 is switched open (i.e. breaking the potentially closed circuit) while the parking lights are "on", the connection between the automatic override switch 80 and the first and second light intensity switches 30, 50 will be reconnected (i.e. as during daytime operation), such that the vehicular lights 14, 16 will continue to have a brighter illumination. The optional "night mode" state provided by the manual night override switch 84 is controlled exclusively by the operator of the vehicle. It potentially enhances both the operator's visibility at night, during dusk and dawn, and also during night/fog or night/rain conditions. Additionally, it increases the vehicle's outward visibility with respect to other vehicle operators more clearly seeing same vehicle during less than optimum environmental conditions. Factory systems lack this functionality, turning "off" as the parking lights come on.

Previously mentioned, a main module power switch 90 may be included in the present invention to allow the user to control the operation of the first and second light intensity switches 30, 50. In particular, the main module power switch 90 is preferably a conventional single pole, double throw switch (with an off or "rest" position) that connects between the ignition key switch 13 and the first and second light intensity switches 30, 50. Thus, when the main module power switch 90 is closed, the connection between the ignition key switch 13 and the electromagnetic coils 30*a*, 50*a* of the first and second light intensity switches 30, 50 is maintained. The connection itself is from the ignition key switch 13 to main power circuit connector 70, then through main module power switch 90 (provided same switch is closed), through circuit connector 75, through the "normally closed" contact set 80*b* of automatic override switch 80, and then to auxiliary power circuit connector 71, which in turn is connected simultaneously to both coil inputs 30*a*, 50*a* of the first and second light intensity switches 30, 50. Conversely, when the main module power switch 90 is open, the connection between the ignition key switch 13 and the first and second light intensity switches 30, 50 will be broken. In this case the daytime running light module 22 will not control the vehicular lights 14, 16, allowing them to reconnect to their original or factory connections and resulting in the same operational functioning of vehicular lights 14, 16 without the control of the daytime running light module 22. Factory daytime running light systems also lack this functionality, and such a control feature is particularly advantageous to a game hunter, who uses his vehicle to enter the woods during early morning hours and is trying not to draw attention to same vehicle upon arrival.

The present invention includes an operational indicator 96, such as a two input, three color light emitting diode. The operational indicator 96 provides feedback or notice to the user concerning the operational state of the daytime running light module 22 at all times. The operational indicator 96 includes two "dropping" resistors 98, and has a negative terminal that is connected to ground 27. One of these resistors 98 is connected in-line with the first input of the indicator and the circuit connector/output 99, thus causing the light emitting diode to illuminate green when 12 volts is present at circuit connector/output 99. The other resistor 98 is connected in-line with the second input of the diode and circuit connector/output 97, thus causing the light emitting diode to illuminate red when 12 volts is present at circuit connector/output 97. These resistors 98 reduce or "drop" the 12-volt output from the module circuit connector/outputs 99, 97 to about 2 volts, such as is required by the light emitting diode, or commonly known as a LED.

When the operational indicator 96 is illuminated green, the daytime running light module 22 is "on". This occurs only if both the vehicle's ignition key switch 13 and the module 22 itself are both "on". The ensuing connection is from ignition key switch 13 to main power circuit connector 70, then through expandability loop 74, through circuit connector/output 76, through the "normally open" contacts of contact set 50*e* of energized light intensity switch 50, then through circuit connector/output 99, then to resistor 98 and on to operational indicator 96. Note that second intensity light switch 50 must be energized to allow the circuit connector/output 99 to produce an output. Such can occur only if the module 22 is "on", as the completed circuit supplying voltage to circuit connector/output 99 is disconnected at contact set 50*e* of light intensity switch 50 when the module 22 is "off".

When the operational indicator 96 is illuminated orange, then the daytime running light module 22 is uniquely "on" while the parking lights (and/or headlights 11) are also turned on. This orange LED output represents the manually canceling of the nighttime override function of the module, and is accomplished by manually switching the manual night override switch 84 "open", as previously described. Orange illumination from the LED only occurs when both the green and red illumination of the operational indicator 96 are energized simultaneously. When the module 22 is in this mode, one half of the dual LED input connection itself is from the ignition key power source 12, through ignition key switch 13 to main power circuit connector 70, then through expandability loop 74, through circuit connector/output 76, through the "normally open" contacts of contact set 50*e* of energized light intensity switch 50, then through circuit connector/output 99, then to resistor 98 and on to operational indicator 96, producing the green illumination. At the same time, parking light voltage enters the module 22 at parking light input connector 32, through circuit connector 39, through the "normally open" contacts of contact set 30*e* of energized light intensity switch 30, then through circuit connector 73, through expandability loop 72, then to circuit connector/output 97, then to resistor 98 and on to operational indicator 96, producing the red illumination. Both primary colors of illumination energized at the same time yield the orange illumination that indicates the module's nighttime "on" state. Note that both intensity light switches 30 and 50 must be energized, and the parking lights must also be on to allow the circuit connector/outputs 99 and 98 to be energized at the same time. Such a situation occurs only if the module 22 is "on" and the parking lights are "on" simultaneously.

When the operational indicator 96 is illuminated red, then the daytime running light module 22 is "off". This occurs in two cases: when the main power switch 90 is switched off, or when the automatic night override 80 switch has automatically turned the module "off" because the parking lights (and/or headlights 11) are turned "on" (via a closed circuit connection at manual night override switch 84). In either case, the operational indicator 96 receives power by connecting the power source 12 through ignition key switch 13 to main power circuit connector 70, then through expandability loop 74, through circuit connector/output 76, through the "normally closed" contacts of contact set 50*e* of light intensity switch 50, then through circuit connector/output 97, then to resistor 98 and on to operational indicator 96, producing the red illumination. Note that second intensity light switch 50 must be "off" to allow the circuit connector/output 97 to produce such an output. Such can occur only if the module is "off" and the ignition key is "on".

Finally, if the operational indicator 96 has no illumination at all, then the daytime running light module 22 has lost a connection to the ignition key switch 13, has blown fuse 15, or has lost ground connection 27. Since the illumination states of the operational indicator 96 are accomplished using switched contact logical feedback from one or both of contact sets 30*e*, 50*e* on each of the intensity switches 30, 50, it can be said that the operational indicator 96 uses active feedback to inform the vehicle operator as to the operating state of the module 22 at any given moment.

Figure 3:
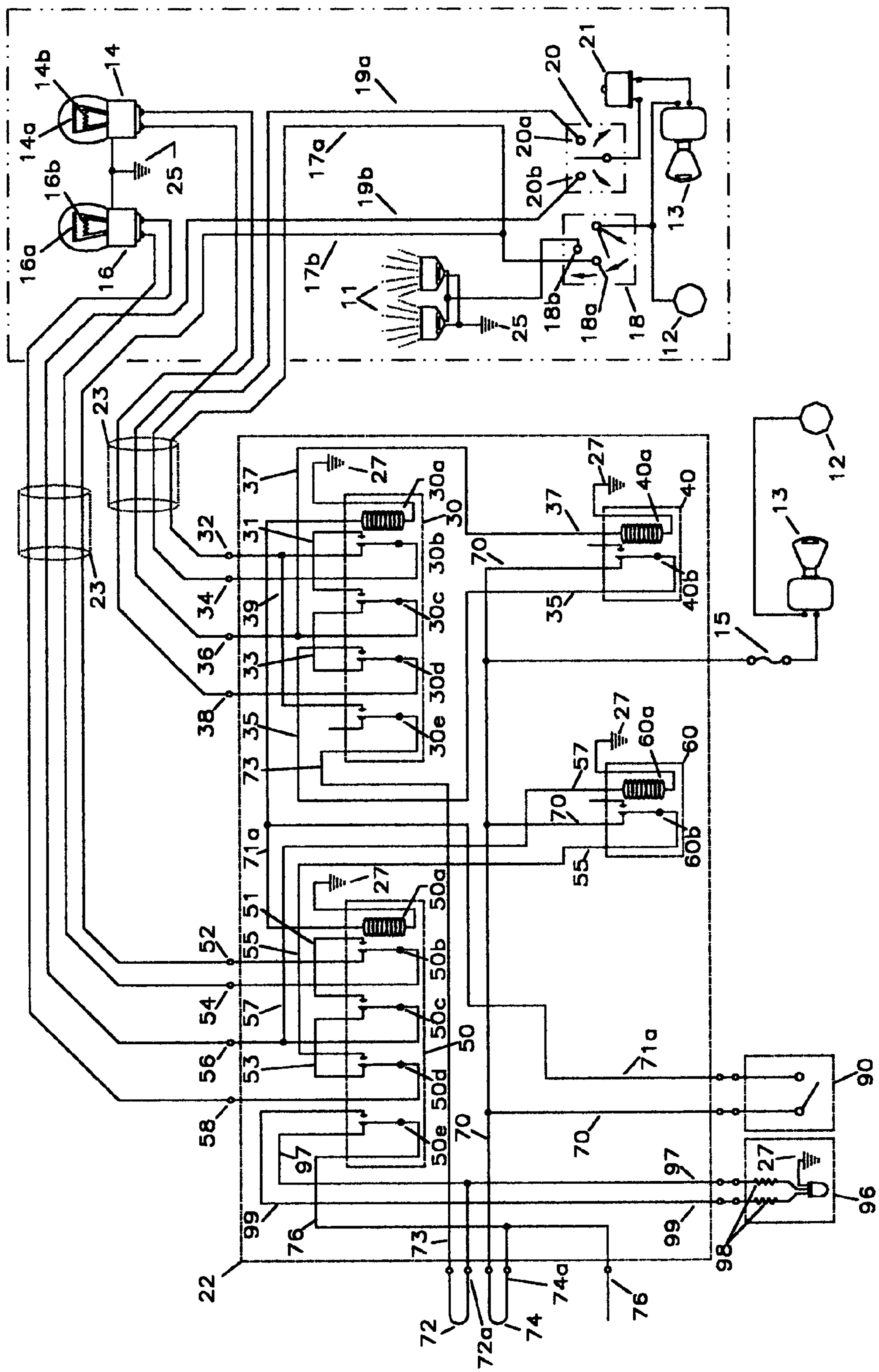
FIG. 3 is a schematic drawing of another embodiment of the manually operated daytime running light module of the present invention.

In the embodiment of the daytime running light module 22 illustrated in FIG. 3, the design of the daytime running light module 22 has been simplified to include only a main module power switch 90 to control operation of the module 22. The "automatic" day and night switching functionality from the module 22 as shown in FIG. 2 has been removed, and control of the module 22 is operator dependent. That is, the operator determines when the additional light is required, and may do so anytime the ignition key switch 13 is "on". When the manual operation running light module 22 is desired, the operator simply turns the main module power switch 90 on, which in turn connects the module 22 with the ignition key switch 13 and the power source 12. Specifically, ignition key switch 13 connects main power circuit connector 70 to one side of main module power switch 90, which when "closed" connects to auxiliary power circuit connector 71*a*, which in turn is connected simultaneously to both coil inputs 30*a*, 50*a* of the first and second light intensity switches 30, 50.

Comparing FIGS. 2 and 3, the automatic override switch 80 and the manual night override switch 84 are removed from FIG. 2 to achieve the embodiment of the manual operation running light module 22 illustrated in FIG. 3. This is due to the fact that there is no need for automatic operation in the embodiment of the "on demand" manual operation running light module 22 shown in FIG. 3. There are some automobile operators who dislike daytime running lights for various reasons, but purchase and utilize aftermarket fog lights on their vehicle, as long as same operator can control where and when these auxiliary lights are energized. The embodiment illustrated in FIG. 3 is a simplified or economy version of the daytime running light module 22 that provides the operator with total control of the vehicular lights 14, 16. That is, this embodiment allows the user to manually determine when the vehicular lights 14, 16 will have a brighter illumination while the vehicle is in operation.

Figure 4:
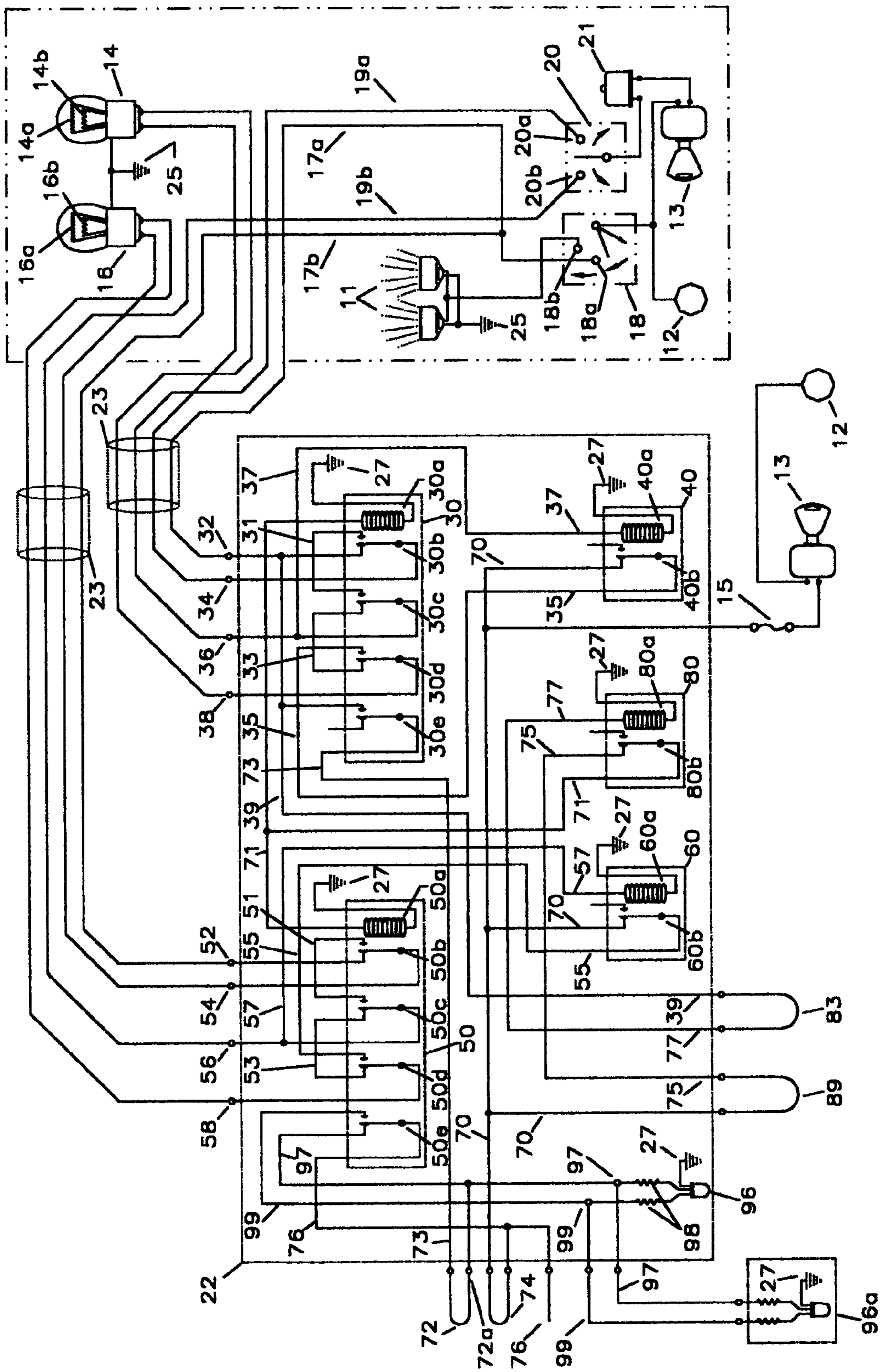
FIG. 4 is a schematic drawing of another embodiment of the automatically operated daytime running light module of the present invention.

Looking now to FIG. 4, another embodiment of the daytime running light module 22 is illustrated. This module 22 of this embodiment is considered to be a commercial vehicle or "fleet" version. That is, for a single vehicle or fleet of vehicles that typically operate in the daytime, there is little need for the operator of such a vehicle to interface with and control the module 22. Therefore, the module 22 is allowed to function completely automatically. Here, the operational indicator 96 is built into the module 22 at the circuit board level, and a second optional operational indicator 96*a* is mounted where the operator can see the operational states of the module 22. The previous vehicle operator switching 90, 84, as found in FIG. 2, are now replaced by two loops 83 and 89. The first is a main power loop 89, and the second loop is a night override loop 83. The embodiment of the module 22 shown in FIG. 4 most closely operates like a factory system. That is, the module 22 is energized when the vehicle lights are off, and the module 22 is "off" at night when the vehicle lights are on. Moreover, this embodiment is lacking the controls to turn the daytime running lights "off" when the vehicle is running, and it is also lacking the controls to turn the daytime running lights "on" anytime the parking lights and/or headlights 11 are activated.

Figure 5:
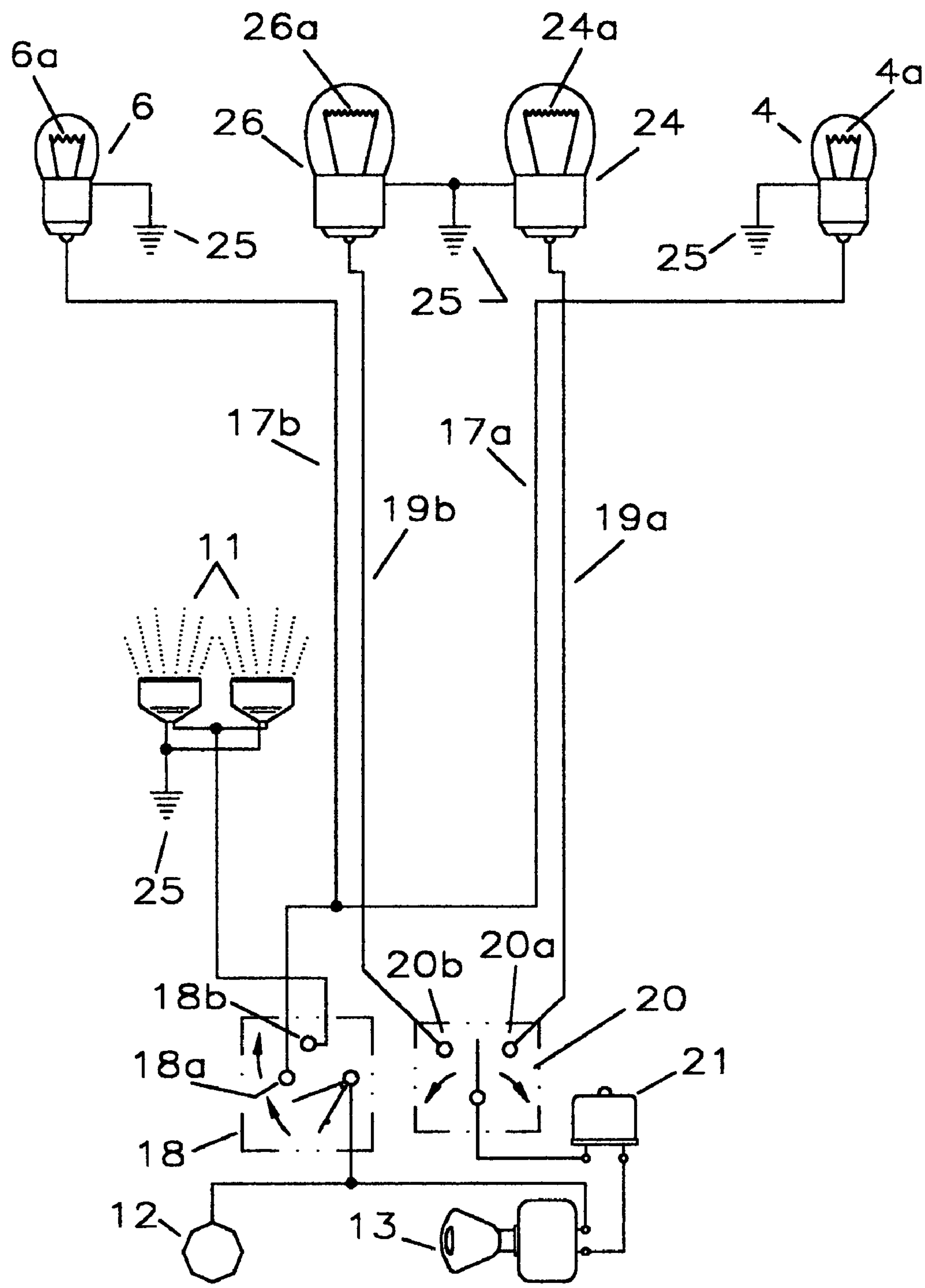
FIG. 5 is a schematic drawing of connection of parking lights/turn signal lights of a conventional import vehicle of the prior art.

Many imported vehicles typically have a different parking light/turn light configuration, similar to that shown in FIG. 5. These vehicles use separate parking light bulbs 4, 6 containing dimmer bulb filaments 4*a*, 6*a*. Such vehicles then utilize additional but separate turn signal bulbs 24, 26 containing brighter filaments 24*a*, 26*a*. Vehicles with this type of arrangement may utilize the parking light bulbs 4, 6 to be both forward projecting parking lights for oncoming traffic, and to also be the front lighted side marker lights for traffic approaching the vehicle from the side. More will be discussed about this further herein.

Figure 6:
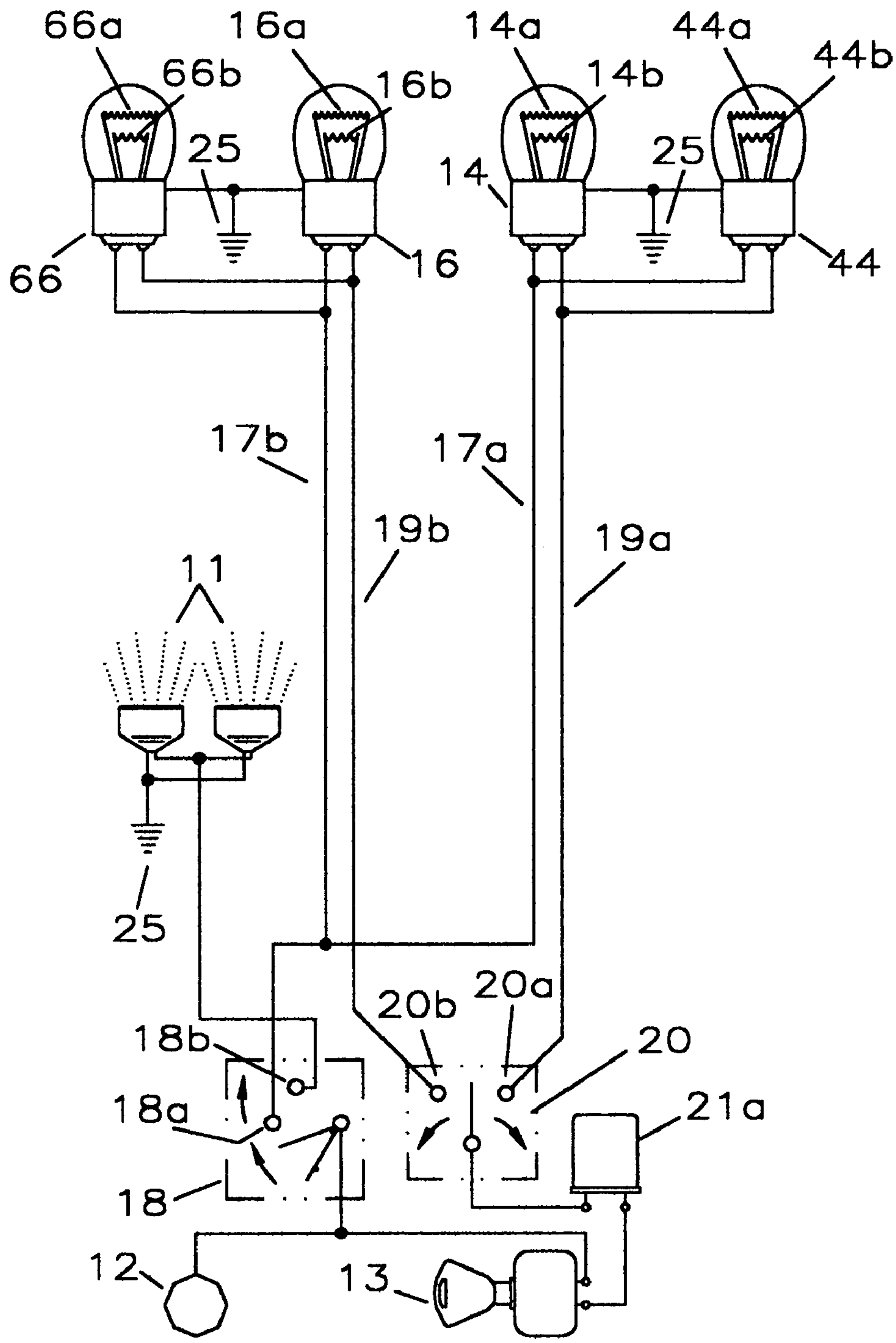
FIG. 6 is a schematic drawing of connection of parking lights/turn signal lights of some luxury vehicles of the prior art.

Another uniquely different parking light/turn light configuration can be found in some luxury vehicles, and/or in vehicles where the styling of the front lighting system is emphasized. Such a system is shown in FIG. 6, where two dual filament bulbs are utilized for each side of the front of the vehicle. Bulbs 14 and 44 are wired together in parallel for the front right side of the vehicle, as shown. Bulbs 16 and 66 are wired similarly for the front left side of the vehicle. Note that this type of system nearly always uses a specially designed flasher 21*a* that is designed specifically for the additional current loads presented by the addition of bulbs 44 and 66.

Figure 7:
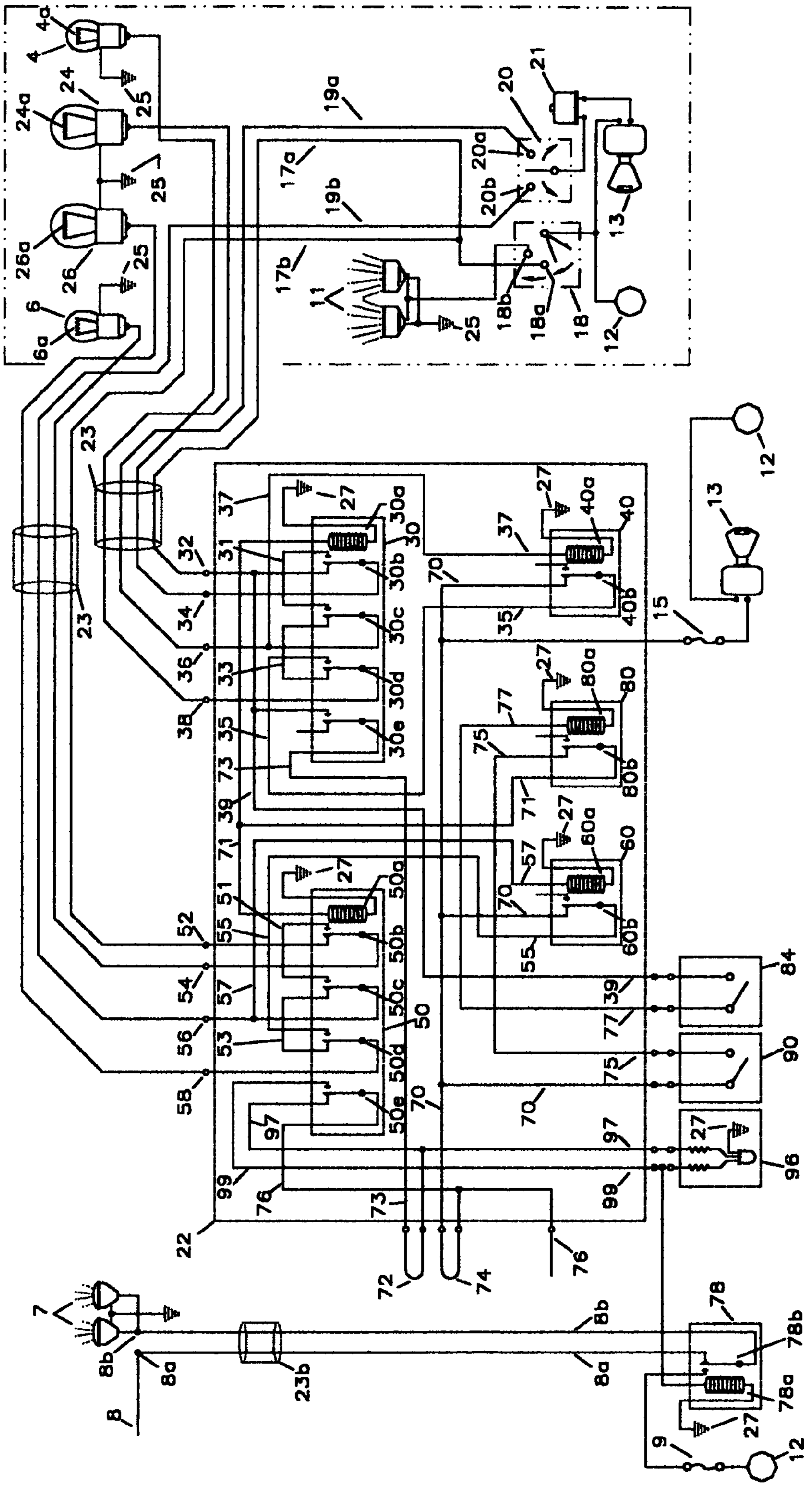
FIG. 7 is a schematic drawing of another embodiment of the daytime running light module of the present invention.

FIG. 7 shows the daytime running light module 22 integrated into an imported vehicle as discussed in FIG. 5. Additionally, the daytime running light module 22 has been designed with expandability in mind, and has the ability for both minor and major expandability events. FIG. 7 shows a minor expandability event, using the active feedback signals that normally feed to the operational indicator 96. In this case, it is necessary to include an auxiliary, 12-volt single pole, double throw expansion switch 78 (such as a relay) as shown. In this example, the vehicle possesses driving lights 7 that are supplied control voltage from a source connector 8. The source connector 8 is interrupted, and source feed circuit connector 8*a* and light connector 8*b* are connected back to expansion switch 78 using two strand 18-gauge shielded cable 23*b*. The light connector 8*b* is connected to the "common" switched terminal of contact set 78*b*, and the source feed connector 8*a* is connected to the "normally closed" switched terminal of contact set 78*b*. This causes the driving lights 7 to be connected to their normal factory connection as long as expansion switch 78 remains non-energized or in the "off" position. The "normally open" switched terminal of contact set 78*b* is connected to power source 12 through auxiliary fuse 9, and one side of coil 78*a* is connected to circuit connector/output 99. The other side of coil 78*a* is connected to ground 27. Subsequently, when the operational indicator 96 is illuminated green (i.e. the module is "on"), 12 volts supplied from circuit connector/output 99 energizes expansion switch 78 and forces driving lights 7 to be activated, regardless of the state of source connector 8.

As mentioned previously, some imported vehicles utilize the parking light bulbs 4, 6 as shown in FIG. 5 to be both forward projecting parking lights for oncoming traffic, and also to be the front lighted side marker lights for traffic approaching the vehicle from the side. In this specific instance, the connection of the daytime running light module 22 in its normal configuration will connect the original parking light filaments 4*a*, 6*a* as surrogate or substitute turn signal bulbs, with the vehicle's turn signal circuitry rerouted to those same filaments as long as the daytime running light module 22 is energized. When the parking lights are off, this feature of the module 22 is advantageous because when a turn signal is activated, both high and low intensity bulbs on that side of the vehicle alternate energizing on and off. When the parking lights are activated and the module 22 is "on", however, this is a disadvantage because the parking light output from the vehicle is no longer connected to the parking light bulbs 4, 6. Since U.S. law has required lighted side markers on vehicles since 1968, defeating these lights by the module's normal American vehicle operation is unacceptable, and an adaptation to correct for this is necessary.

Figure 8:
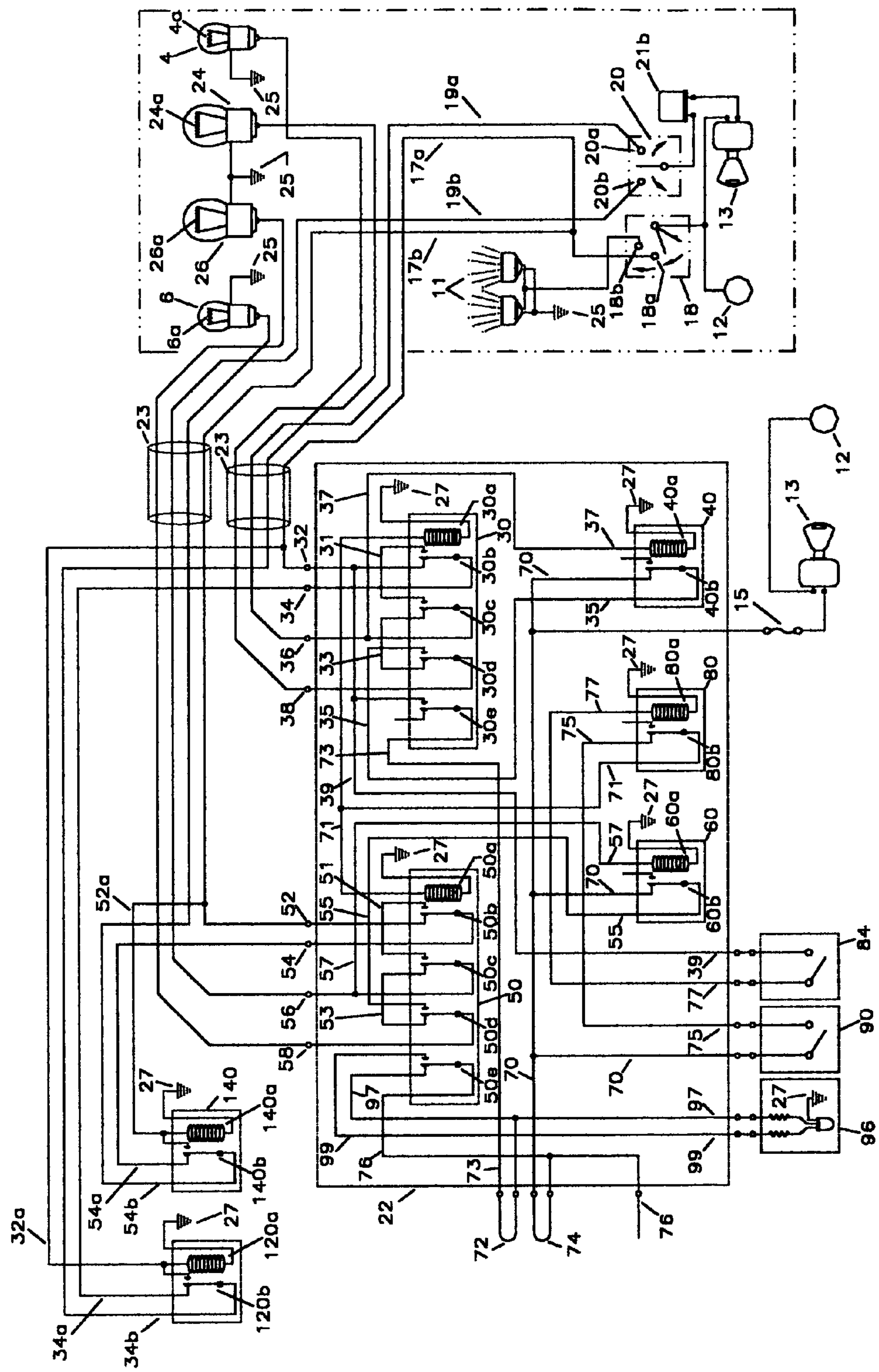
FIG. 8 is a schematic drawing of another embodiment of the daytime running light module of the present invention.

FIG. 8 shows such an adaptation, and in this case it is necessary to include two secondary light switches 120, 140 preferably single pole, double throw switches (such as relays). For the right parking light side, parking light source voltage from parking light input connector 32 is connected to both one end of coil 120*a* and the "normally open" terminal of contact set 120*b* of secondary light switch 120 via external circuit connector 32*a*. The other end of coil 120*a* of secondary light switch 120 is connected to ground 27. The parking light input connector 34 of first intensity light switch 30 is connected to the "normally closed" terminal of contact set 120*b* via external circuit connector 34*b*. Also the "common" terminal of contact set 120*b* of secondary light switch 120 is connected to the dimmer filament 4*a* of parking light bulb 4 via external circuit connector 34*b*. At times when the parking lights are "off", the normal connection of the module 22 between parking light input 34 and parking light dimmer filament 4*a* is restored through the contact set 120*b* as long as secondary light switch 120 is relaxed or non energized. When the parking lights are activated, the secondary light switch 120 is energized and connects parking light voltage from external circuit connector 32*b* through contact set 120*b* and external circuit connector 34*b* to energize dimmer filament 4*a* of parking light bulb 4.

For the left parking light side, parking light source voltage from parking light input connector 52 is connected through to both one end of coil 140*a* and the "normally open" terminal of contact set 140*b* of secondary light switch 140 via external circuit connector 52*a*. The other end of coil 140*a* of secondary light switch 140 is connected to ground 27. The parking light input connector 54 of second intensity light switch 50 is connected to the "normally closed" terminal of contact set 140*b* via external circuit connector 54*b*. Also the "common" terminal of contact set 140*b* of secondary light switch 140 is connected to the dimmer filament 6*a* of parking light bulb 6 via external circuit connector 54*b*. At times when the parking lights are "off", the module's normal connection of the module 22 between parking light input 54 and parking light dimmer filament 6*a* is restored through the contact set 140*b* as long as secondary light switch 140 is relaxed or non-energized. When the parking lights are activated, the secondary light switch 140 is energized and connects parking light voltage from external circuit connector 52*b* through contact set 140*b* and external circuit connector 54*b* to energize dimmer filament 6*a* of parking light bulb 6. Also, the secondary light switches 120, 140 could optionally be built into the module 22 at the circuit board level for imported cars.

Notice in FIG. 8 the normal factory thermal flasher 21 has been replaced what is commonly known as a heavy-duty trailer flasher 21*b*. A variable load factory thermal flasher 21 is typically designed for the current requirements of two turn signal filaments: one bright filament for a front bulb, and one bright filament for rear bulb (this is not always the case, as original equipment flashers are designed for the number of bulbs built into the specific vehicle in question). When one of these filament burns out, then the current flowing through the factory thermal flasher 21 changes, and the rate of flash of the simple device either increases (i.e., a fast or rapid flash condition), or freezes in the "on" or always connected (i.e., no flash) state. This is to signal the vehicle operator that a bulb-out condition exists on that specific side of the vehicle, as indicated by the system function change on the affected side. Optionally replacing the factory thermal flasher 21 with a widely available and inexpensive heavy-duty trailer flasher 21*b* is very common when a vehicle is used to tow a trailer, or when the flasher itself burns out. When a trailer is towed behind a vehicle, brake and turn signal lights on the trailer are connected to the vehicle's lighting system. This causes the factory flasher 21 in many cases to falsely signal a bulb-out condition, hence the need for a heavy-duty trailer flasher 21*b*. When a flasher burns out or otherwise fails, all that is typically commercially available are heavy-duty trailer flashers. Such heavy-duty trailer flashers have no bulb-out notice capacity, and flash constantly with either one filament or any number of filaments present. In some cases, integration of the daytime running light module 22 into a vehicle with the module's rerouting of the turn signal circuitry to the parking light filaments is self correcting, with no need for flasher replacement. In the case of a fast flashing bulb-out condition occurring due to the addition of the daytime running light module 22, replacing the factory flasher with a heavy-duty trailer flasher 21*b* solves this problem in a very high percentage of cases. With the absence of connection to the parking light filaments in the night operation as described above and shown in FIG. 8, such flasher replacement as described is necessary.

Figure 9:
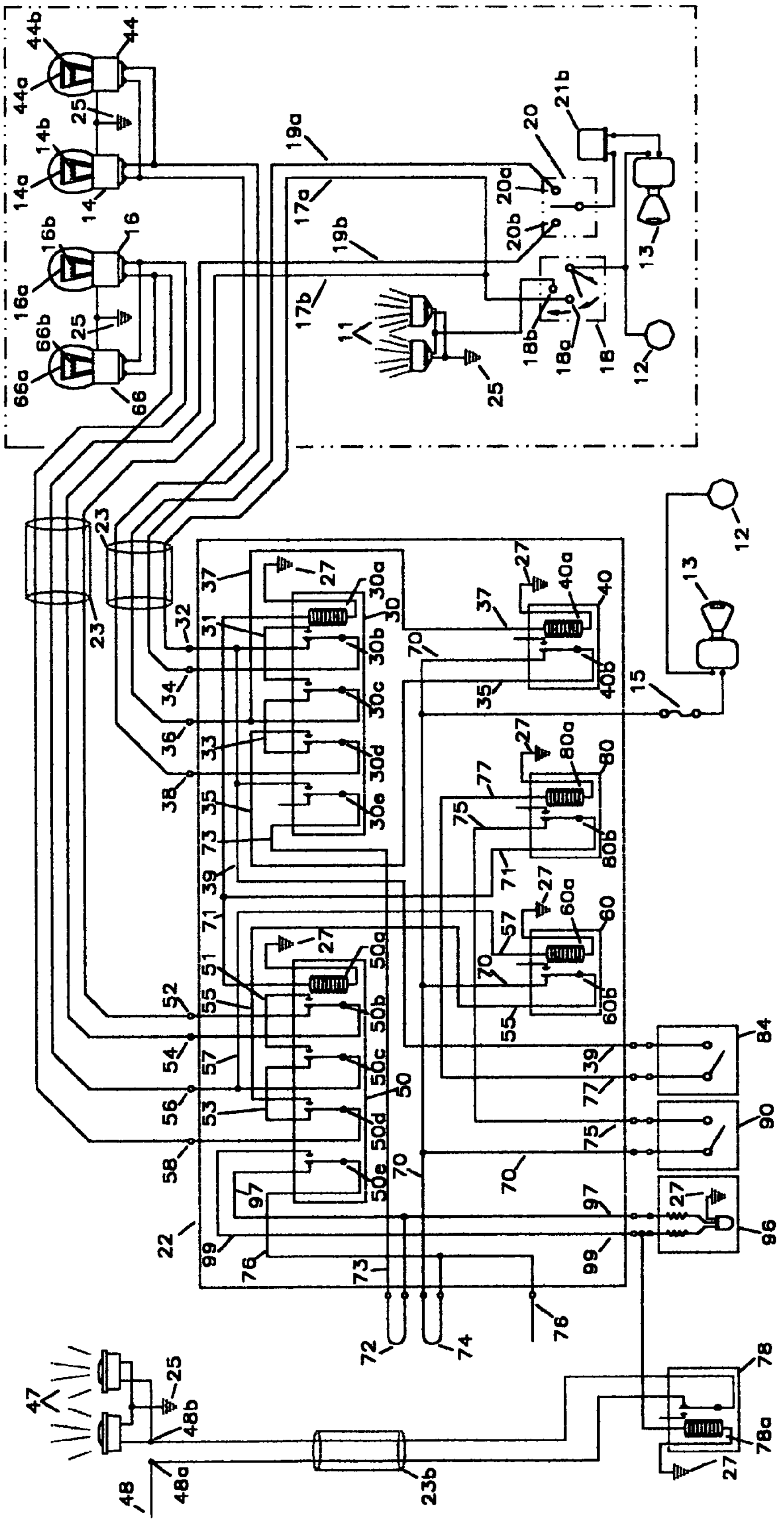
FIG. 9 is a schematic drawing of another embodiment of the daytime running light module of the present invention.

The embodiment shown in FIG. 9 shows the module 22 integrated into a four bulb eight filament system, as shown in FIG. 6. The factory thermal flasher has been replaced with a heavy-duty trailer flasher 21*b* in FIG. 9, as described above, to compensate for the resistive load drop of two lower resistance filaments (i.e., a lower resistance filament equals higher light output) having been replaced in the turn signal system by the higher resistance parking light filaments. FIG. 9 additionally shows another minor expandability event, in this instance to turn "off" factory white daytime running lights 47 when the module activated amber daytime running lights are energized or turned "on". Again it is necessary to include an expansion switch 78, such as a single pole, double throw switch (such as a relay). The vehicle possesses white factory daytime running lights 47 that are supplied control voltage from source connector 48. The source connector is intercepted, and source feed circuit connector 48*a* and light connector 48*b* are connected back to expansion switch 78 using two strand 18 gauge shielded cable 23*b*. The light connector 48*b* is connected to the "common" terminal of contact set 78*b*, and the supply feed connector 48*a* is connected to the "normally closed" terminal of contact set 78*b*. This causes the white factory driving lights 47 to be connected to their normal source connector 48 as long as expansion switch 78 remains non-energized or in the "off" position. The "normally open" terminal of contact set 78*b* has no connection. One side of coil 78*a* is connected to circuit connector/output 99. The other side of coil 78*a* is connected to ground 27. Subsequently, when the operational indicator 96 is illuminated green from 12 volts being supplied from circuit connector/output 99 (i.e. the module is "on"), then the expansion switch 78 is energized and forces the white factory daytime running lights 47 to be deactivated, regardless of the state of source connector 48.

Figure 10:
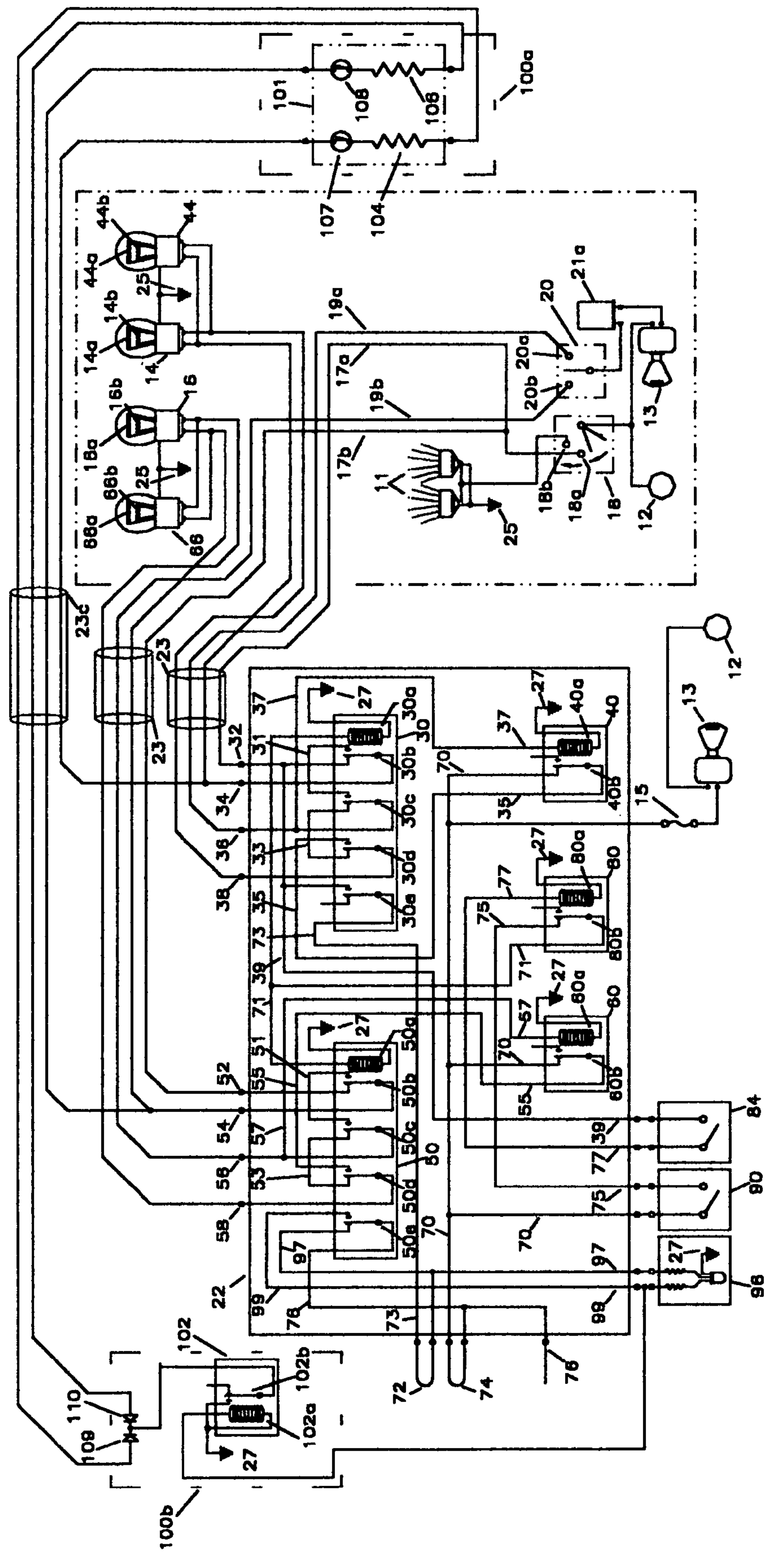
FIG. 10 is a schematic drawing of another embodiment of the daytime running light module of the present invention.

Occasionally, a vehicle's factory thermal flasher 21*a* is designed in such a fashion that it cannot be replaced with a heavy duty trailer flasher 21*b*, as previously discussed. The embodiment in FIG. 10 shows such a case where a two part bulb resistance compensation circuit has been added. The compensation circuit shown consists of a heat sink resistor pack 100*a* mounted in the engine compartment, and a compensation switch-diode pack 100*b* mounted under the dash along with the daytime running light module 22. The heat sink resistor pack 100*a* consists of two bulb compensation resistors 104 and 106, and two thermostats 107 and 108, all mounted in an aluminum heat sink 101. The compensation switch-diode pack 100*b* consists of a compensation switch 102 (such as a relay), and two diodes 109 and 110. All connections between heat sink resistor pack 100*a* and compensation switch-diode pack 100*b* are made using four strand 18-gauge wire 23*c*.

One end of the coil 102*a* of compensation switch 102 is connected to circuit connector/output 99. The other side of coil 102*a* and the "normally open" terminal in contact set 102*b* of compensation switch 102 are both connected to ground 27. The "common" terminal of contact set 102*b* of compensation switch 102 is connected through diodes 109 and 110 to the one end of compensation resistors 104 and 106 inside the heat sink resistor pack 100*a*. The other end of first compensation resistor 104 is connected to parking light output connector 34 through thermostat 107. The other end of second compensation resistor 106 is connected to parking light output connector 54 through thermostat 108. The compensation resistors 104 and 106 operate to provide secondary bulb resistance to the turn signal circuitry in addition to the resistance offered to the same circuitry by the rerouted dimmer parking light filaments, provided three conditions exist: when the module 22 is "on", when compensation switch 102 is energized because of output from circuit connector/output 99, and when one of the turn signals are "on". When the module 22 is "off", compensation resistors 104, 106 cannot add resistance as described above because they are not able to receive a ground connection, since compensation switch 102 is not energized. Additionally, the diodes 109, 110 isolate the compensation resistors 104, 106 from connecting to each other and draining parking light energy when the vehicles parking lights are "on" and the module is "off". When energized, the byproduct of the compensation resistors 104, 106 is heat, and the aluminum heat sink 101 is utilized to dissipate this heat. The thermostats 107, 108 are present to break the compensation resistors 104, 106 respective circuit connection and prevent thermal runaway should the right or left turn signal be mistakenly be left on for a long time while the module 22 is "on".

Figure 11:
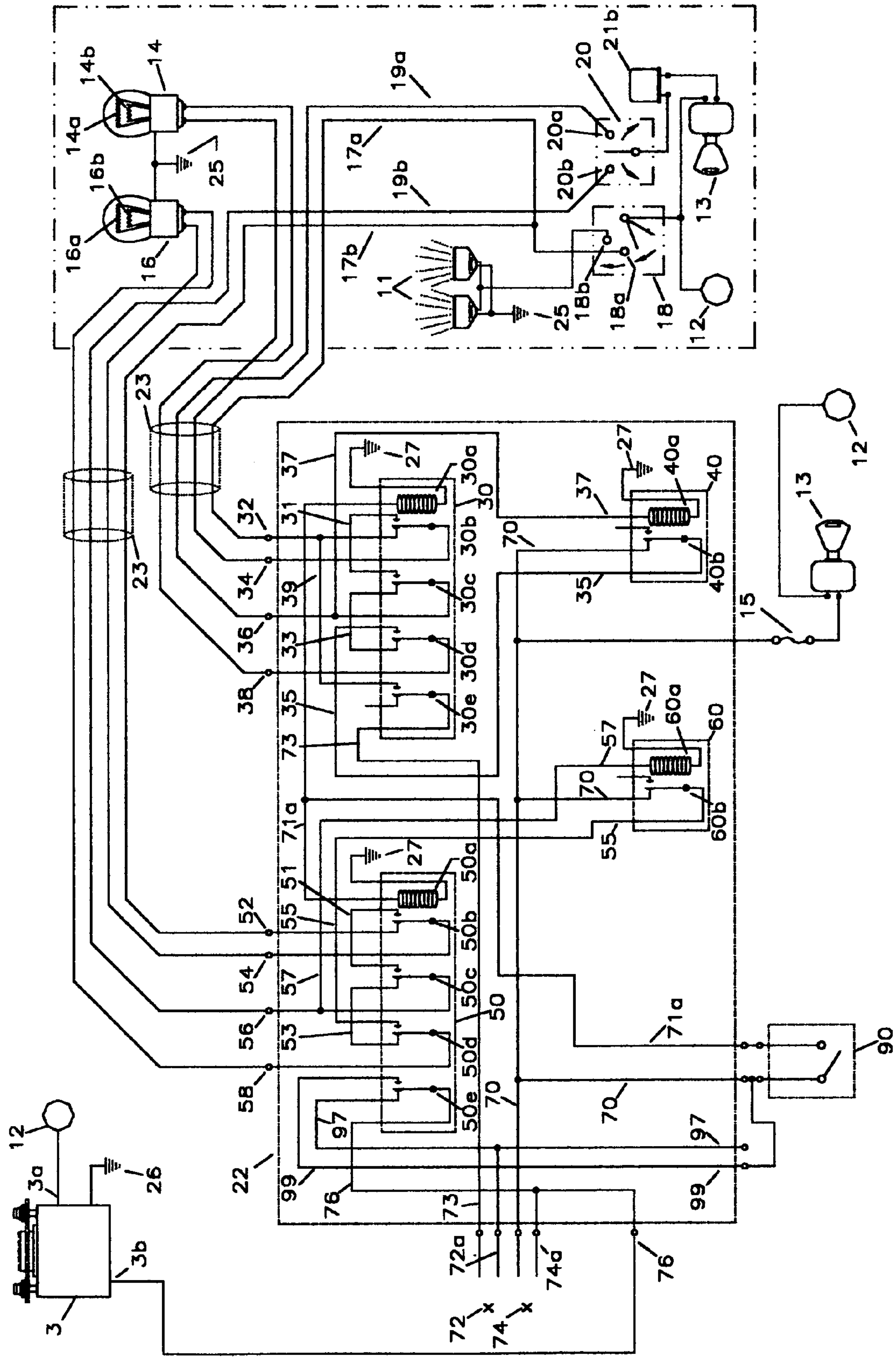
FIG. 11 is a schematic drawing of another embodiment of the manually operated daytime running light module of the present invention.

As mentioned previously, the module 22 has the ability for a major expandability event. An example of such expandability is shown in FIG. 11. For a major expandability event, the module has two expandability loops 72, 74 that when cut allow the entire contact set 50*e* in second intensity light switch 50 to be accessed by the system integrator/installer. This spare arrangement and utilization of a "normally closed", "normally open", and "common" internal contacts is typically referred to as called "dry contacts" in the burglar alarm industry. These contacts, which were previously "wet" with voltage, become "dry" or without voltage due to the cutting of the two expandability loops 72, 74. The module now has the ability to switch powers or grounds, provided the accessories or devices being switched draw less than or up to 6 amps, as the module is currently designed. The module 22 shown is the manual version as previously described in FIG. 3. Expandability loops 72 and 74 are cut, and power from main power circuit connector 70 that feeds main power switch 90 is also connected to circuit connector/output 99. In this example, the ignition keyed positive lead 3*b* from car stereo 3 is connected to expandability lead 76. Car stereo's battery positive lead 3*a* is connected to power source 12, and the same car stereo 3 is connected to vehicle chassis ground 26. When the module 22 is "off", power to ignition keyed positive lead 3*b* of car stereo 3 is not connected due to the contact set 50*e* in second intensity light switch 50 being relaxed, and car stereo 3 cannot turn "on". When the module is "on", power to ignition keyed positive lead 3*b* of car stereo 3 is connected due to the contact set 50*e* in second intensity light switch 50 because second intensity light switch 50 is energized. When expandability loops 72, 74 are cut, the formerly shown operational indicator 96 is not utilized. Such a configuration might be advantageous when the vehicle is taken to the car wash, and/or the car dealership service center. Turning the module 22 "off" at the car wash keeps the daytime running lights from operating while the vehicle is going through the wash, and keeps the car wash attendants from playing the stereo loudly while the vehicle is being cleaned. At the service center, turning the module "off" keeps the dealership from attempting to repair turn signal lights that are stuck "on" and therefore must be "damaged" and in need of repair. It also keeps service personnel from playing the stereo loudly, potentially damaging speakers. This is only one example of a major expandability event that is possible using module's "dry contacts".

It should further be noted that while the present invention discloses the use of relay switches, the switches of the present design could theoretically be replaced with electronic switching, such as solid state relays or their equivalent. As designed, relay switching is more robust and less subject to semi-conductor failure.

Thus, although there have been described particular embodiments of the present invention of a new and useful DAYTIME RUNNING LIGHT MODULE AND SYSTEM, it is not intended that such references be construed as limitations upon the scope of this invention except as set forth in the following claims.

What is claimed is:

1. A vehicular light control module connected between first and second light bulbs and a parking light switch and a turn signal switch, wherein the parking light switch and the turn signal switch are additionally connected to a power source, wherein the first and second light bulbs each include a dim filament connected to the parking light switch and a bright filament connected to the turn signal switch, wherein said vehicular light control module comprises:

- a first light intensity switch connected between the dim filament of the first light bulb and the parking light switch, and further connected between the bright filament of the first light bulb and the turn signal switch;
- a second light intensity switch connected between the dim filament of the second light bulb and the parking light switch, and further connected between the bright filament of the second light bulb and the turn signal switch;
- said first light intensity switch connecting said bright filament of the first light bulb with the power source; and
- said second light intensity switch connecting said bright filament of the second light bulb with the power source.

2. The vehicular light control module as described in claim 1, wherein said first light intensity switch comprises a relay and said second light intensity switch comprises a relay.

3. The vehicle light control module as described in claim 2, wherein said relay includes:

- an energized state, wherein the bright filament is connected with the power source; and
- a non-energized state, wherein the bright filament is connected with the turn signal switch.

4. The vehicle light control module as described in claim 1 further comprising:

- a first turn signal interrupt switch connected to the turn signal switch, the power source, and the bright filament of the first bulb through said first intensity light switch, wherein said first turn signal interrupt switch operates in an alternating opening and closing switched energized state to force the bright filament of the first bulb into a flashing operational state.

5. The vehicle light control module as described in claim 1 further comprising:

- a second turn signal interrupt switch connected to the turn signal switch, the power source, and the bright filament of the second bulb through said second intensity light switch, wherein said second turn signal interrupt switch operates in an alternating opening and closing switched energized state to force the bright filament of the second bulb into a flashing operational energized state.

6. The vehicular light control module as described in claim 1 further comprising:

- an automatic override switch connected to the parking light switch, the power supply, said first light intensity switch and said second light intensity switch, said automatic override switch controlling operation of said first light intensity switch and said second light intensity switch.

7. The vehicular light control module as described in claim 6 further comprising:

- a main module power switch connected with said automatic override switch, said first light intensity switch, said second light intensity switch, and said power supply; said main module power switch controlling operation of said first light intensity switch and said second light intensity switch.

8. The vehicular light control module as described in claim 6 further comprising

- a manual night override switch connected to said automatic override switch, said manual night override switch controlling operation of said automatic override switch in said control module.

9. The vehicular light control module as described in claim 1 further comprising:

an operational indicator connected to said first light intensity switch and said second light intensity switch, said operational indicator providing feedback corresponding to the operational state of said control module.

10. The vehicular light control module as described in claim 1 further comprising:

an expansion switch connected between an auxiliary vehicle device and the power source, said expansion switch controlling the operation of said auxiliary vehicle device.

11. The vehicular light control module as described in claim 1 further comprising:

a first secondary light switch connected to said first intensity light switch and to a first parking light bulb, said first secondary light switch controlling operation of the first parking light bulb; and a second secondary light switch connected to said second intensity light switch and to a second parking light bulb, said second secondary light switch controlling operation of the second parking light bulb.

12. The vehicular light control module as defined in claim 1, further comprising:

means for providing signaling compensation to the dim filament of the first light bulb should the bright filament of the first light bulb fail; and means for providing signaling compensation to the dim filament of the second light bulb should the bright filament of the second light bulb fail.

13. A vehicle light control module in a vehicular light assembly having at least one vehicular bulb having a first filament and a second filament, wherein the first filament is connected to the power source through a turn signal switch connected to a thermal flasher further connected to an ignition key switch, and the second filament is connected to a power source through a headlight switch, wherein the first filament provides a first light intensity when connected to the power source and the second filament provides a second light intensity when connected to the power source, said vehicle light control module comprising:

a light intensity switch connected to the first filament, the second filament, the headlight switch, and the turn signal switch;

said light intensity switch operating in an energized state and a non-energized state;

said light intensity switch connecting the first filament with the power source and optionally said second filament with said turn signal switch in said energized state; and said light intensity switch connecting the first filament with the turn signal switch and the second filament with the headlight switch in said non-energized state.

14. The vehicle light control module as described in claim 13 wherein said light intensity switch comprises a relay.

15. The vehicular light control module as described in claim 13 further comprising:

a turn signal interrupt switch connected to the turn signal switch, the power source, and the bright filament of the light bulb through said light intensity switch, wherein said turn signal interrupt switch operates in an alternating opening and closing switched energized state to force the bright filament of the first bulb into a flashing operational energized state.

16. The vehicular light control module as described in claim 13 further comprising:

an automatic override switch connected to the headlight switch, the power supply, said light intensity switch, said automatic override switch controlling operation of said light intensity switch.

17. The vehicular light control module as described in claim 16 further comprising:

a main module power switch connected with said automatic override switch, said light intensity switch, and said power supply; said main module power switch controlling operation of said light intensity switch.

18. The vehicular light control module as described in claim 16 further comprising a manual night override switch connected to said automatic override switch, said manual night override switch disconnecting said automatic override switch from said control module.

19. The vehicular light control module as described in claim 13 further comprising:

means for preventing simultaneous operation of the first filament and the second filament when the first filament is continuously energized and the headlight switch is activated, said prevention means providing signaling compensation to the second filament should the first filament fail.

20. The vehicular light control module as described in claim 13 further comprising:

a secondary light switch connected to said intensity light switch and to a parking light bulb, said secondary light switch controlling operation of the parking light bulb.

21. The vehicle light control module as described in claim 14, wherein said relay comprises:

an energized state, wherein the first filament is connected with the power source; and a non-energized state, wherein the first filament is connected with the turn signal switch.

22. A vehicle light control module in a vehicular light assembly having at least one vehicular bulb having a first filament and a second filament, wherein the first filament is connected to a power source through a turn signal switch connected to a thermal flasher further connected to an ignition key switch, and the second filament is connected to a power source through a headlight switch, wherein the first filament provides a first light intensity when connected to the power source and the second filament provides a second light intensity when connected to the power source, said vehicle light control module comprising:

means for controlling the light intensity of the first filament and the second filament, said light controlling means being connected to the first filament, the second filament, the headlight switch, and the turn signal switch;

said controlling means operating between an energized state, wherein said controlling means connects the first filament with the power source and optionally the second filament with said turn signal switch, and a non-energized state, wherein said controlling means connects the first filament with the turn signal switch and the second filament with the headlight switch.

* * * * *